United States Patent
Imai et al.

(10) Patent No.: US 8,124,685 B2
(45) Date of Patent: Feb. 28, 2012

(54) ADHESIVE COMPOSITION AND FILM ADHESIVE

(75) Inventors: Hirofumi Imai, Kawasaki (JP); Koki Tamura, Kawasaki (JP); Koichi Misumi, Kawasaki (JP); Takahiro Asai, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 1 day.

(21) Appl. No.: 12/683,688

(22) Filed: Jan. 7, 2010

(65) Prior Publication Data

US 2010/0178499 A1     Jul. 15, 2010

(30) Foreign Application Priority Data

Jan. 13, 2009  (JP) .................. 2009-005073
Aug. 20, 2009  (JP) .................. 2009-191178

(51) Int. Cl.
C08L 37/00      (2006.01)
(52) U.S. Cl. ............. 524/548; 428/355 AC; 524/556; 524/560; 526/262
(58) Field of Classification Search ............ 428/355 AC; 524/548, 556, 560; 526/262
See application file for complete search history.

(56) References Cited

U.S. PATENT DOCUMENTS

| | | | |
|---|---|---|---|
| 5,573,778 | A | 11/1996 | Therriault et al. |
| 5,798,426 | A | 8/1998 | Anton et al. |
| 6,080,480 | A | 6/2000 | Shiba et al. |
| 6,337,288 | B1 | 1/2002 | Ohya et al. |
| 6,432,475 | B1 | 8/2002 | Yamamoto et al. |
| 6,489,396 | B2 | 12/2002 | Nakamura et al. |
| 7,097,959 | B1 * | 8/2006 | Ryu et al. ............ 430/280.1 |
| 2002/0091197 | A1 | 7/2002 | Nakamura et al. |
| 2002/0127821 | A1 | 9/2002 | Ohya et al. |
| 2004/0043236 | A1 | 3/2004 | Kugo et al. |
| 2004/0202879 | A1 | 10/2004 | Xia et al. |
| 2005/0075444 | A1 * | 4/2005 | Tosaki et al. .............. 524/502 |
| 2005/0170612 | A1 | 8/2005 | Miyanari et al. |
| 2005/0182186 | A1 | 8/2005 | Gielens et al. |
| 2005/0261433 | A1 | 11/2005 | Takeko et al. |
| 2009/0137760 | A1 | 5/2009 | Misumi et al. |
| 2010/0178498 | A1 | 7/2010 | Imai et al. |

FOREIGN PATENT DOCUMENTS

| | | |
|---|---|---|
| JP | 61-158145 | 7/1986 |
| JP | 2-3483 | 1/1990 |
| JP | 7-233356 | 9/1995 |
| JP | 7-268037 | 10/1995 |
| JP | 8-319464 | 12/1996 |
| JP | 2001-77304 | 3/2001 |
| JP | 2001-115124 | 4/2001 |
| JP | 2001-279208 | 10/2001 |
| JP | 2002-203821 | 7/2002 |
| JP | 2002-206042 | 7/2002 |
| JP | 2003-173993 | 6/2003 |
| JP | 2003-292931 | 10/2003 |
| JP | 2003-313518 | 11/2003 |
| JP | 2005-191550 | 7/2005 |
| JP | 2005-314453 | 11/2005 |
| JP | 2007-119646 | 5/2007 |
| JP | 2008-38039 | 2/2008 |
| JP | 2008-133405 | 6/2008 |

OTHER PUBLICATIONS

U.S. Appl. No. 12/516,363, filed May 27, 2009, entitled "Adhesive Composition and Adhesive Film".
Office Action mailed on Aug. 18, 2010 in co-pending U.S. Appl. No. 12/516,363.
Office Action mailed on Jan. 31, 2011 in co-pending U.S. Appl. No. 12/516,363.
United States Office Action mailed Nov. 16, 2010 in co-pending U.S. Appl. No. 12/654,840.
U.S. Appl. No. 12/654,840, filed Jan. 6, 2010, entitled "Adhesive Composition and Film Adhesive", Imai et al.
U.S. Office Action issued Apr. 21, 2011 in co-pending U.S. Appl. No. 12/654,840.
U.S. Advisory Action issued Jun. 30, 2011 in co-pending U.S. Appl. No. 12/654,840.
United States Advisory Action mailed Apr. 6, 2011 in co-pending U.S. Appl. No. 12/516,363.

* cited by examiner

*Primary Examiner* — David W Wu
*Assistant Examiner* — Marie Reddick
(74) *Attorney, Agent, or Firm* — Wenderoth, Lind & Ponack, L.L.P.

(57) ABSTRACT

An adhesive composition of the present invention is an adhesive composition including a polymer obtained by copolymerizing a monomer composition containing a (meth)acrylic acid ester and a monomer having a maleimide group, the (meth)acrylic acid ester has a structure represented by General Formula (1):

[Chem. 1]

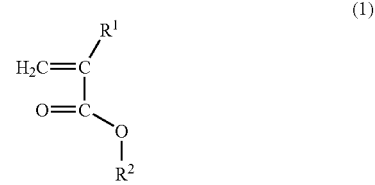

(1)

wherein $R^1$ is a hydrogen atom or a methyl group, and $R^2$ is a C4 to C20 alkyl group, and the (meth)acrylic acid ester is contained in the monomer composition by 10 to 50 parts by mass where an amount of the monomer composition is 100 parts by mass. With the arrangement, it is possible to provide an adhesive agent and a film adhesive each of which can be suitably used in high temperature processing.

3 Claims, No Drawings

ADHESIVE COMPOSITION AND FILM ADHESIVE

This Nonprovisional application claims priority under 35 U.S.C. §119(a) on Patent Applications No. 2009-005073 filed in Japan on Jan. 13, 2009 and No. 2009-191178 filed in Japan on Aug. 20, 2009, the entire contents of which are hereby incorporated by reference.

TECHNICAL FIELD

The present invention relates to an adhesive composition and a film adhesive. More specifically, the present invention relates to an adhesive composition and a film adhesive, each for temporarily fixing a sheet or a protection board to a product being processed, in a step of carrying out processing such as grinding of semiconductor products (e.g., semiconductor wafer), optical products, or the like.

BACKGROUND ART

In recent years, due to multiple functioning of mobile phones, digital AV devices, IC cards, and the like, demands have been increasing for downsizing, reduction in thickness, and high integration of semiconductor silicon chips (hereinafter referred to as "chips"). Further, the reduction of thickness is demanded for integrated circuits in which a plurality of chips are integrated, as typified by CSP (chip size package) and MCP (multi-chip package). In order to respond to the needs for a thin product, it is required to reduce the thickness of a chip to not more than 150 μm. Further, it is required to process the chip so that its thickness is reduced to not more than 100 μm for the CSP and the MCP, and not more than 50 μm for the IC card. A system-in-package (SiP) in which a plurality of semiconductor chips are mounted in a single semiconductor package has become an extremely important technique in order to accomplish downsizing, reduction in thickness, and high integration of chips that are installed in the semiconductor package. The downsizing, reduction in thickness and high integration enables realization of multiple functioning, downsizing, and reduction of weight of electronic devices.

Conventionally, SiP products are manufactured by use of a method in which individual bumps (electrodes) provided on each of stacked chips are wired to a circuit board by a wire bonding technique. In order to respond to the demand for the reduction in thickness and high integration, a through-hole electrode technique is required, not the wire bonding technique. The through-hole electrode technique is a technique in which (i) chips each having a through-hole electrode are stacked and (ii) a bump is formed on a backside of the chips thus stacked.

A thin chip is manufactured by, for example, a method as follows: (i) a high-purity single crystal silicon or the like is sliced to a wafer form, (ii) a predetermined circuit pattern of an IC or the like is formed on a surface of the wafer by etching the surface of the wafer so that an integrated circuit is built, (iii) a back surface of the semiconductor wafer thus obtained is grinded by use of a grinder, and (iv) after the semiconductor wafer is grinded to a predetermined thickness, the semiconductor wafer is diced so as to form a chip shape. At this time, the predetermined thickness is around a range of 100 μm to 600 μm. Further, in a case of a chip in which a through-hole electrode is to be formed, the wafer is grinded to a thickness of around a range of 50 μm to 100 μm.

In the manufacture of the semiconductor chip, the semiconductor wafer readily breaks in a case where external force is given to the wafer in the grinding step or at the time when the wafer is carried to the dicing step. This is because the semiconductor wafer is thin and fragile, and because circuit patterns are unlevel. Moreover, the grinding step is carried out by pouring purified water over the back surface of the semiconductor wafer for the purpose of removing grinding dust or heat generated at the time of grinding. At this time, there is the need to prevent contamination of a circuit pattern surface due to the purified water used in cleaning or the like. Accordingly, in order to protect the circuit pattern surface of the semiconductor wafer and prevent breakage of the semiconductor wafer, a film adhesive for processing is attached on the circuit pattern surface while the grinding process is carried out.

In addition to the above examples, a step that requires high temperature processing, such as a step of forming a through-hole electrode, is also carried out in such a manner that the semiconductor wafer is fixed by adhesive. There have been suggested several adhesive compositions and several adhesive sheets that can be preferably used in such a step involving the high temperature processing (for example, Patent Literatures 1, 2, and 3).

CITATION LIST

Patent Literature 1
Japanese Patent Application Publication, Tokukai, No. 2007-119646 A (Publication Date: May 17, 2007)
Patent Literature 2
Japanese Patent Application Publication, Tokukai, No. 2008-38039 A (Publication Date: Feb. 21, 2008)
Patent Literature 3
Japanese Patent Application Publication, Tokukai, No. 2008-133405 A (Publication Date: Jun. 12, 2008)

SUMMARY OF INVENTION

Technical Problem

However, in order to improve speeds of semiconductor processing and perfectly avoid unnecessary residues remaining on a finished product in processing steps, it is further desired for the adhesive compositions disclosed in Patent Literatures 1 through 3 to improve solubility for a stripping solution while maintaining suitability for the high temperature processing. Especially, an adhesive composition containing a monomer into which a maleimide group is introduced has properties suitable for the high temperature processing (for example, heat resistance and high adhesiveness in a high temperature environment). However, the adhesive composition tends to have low solubility for a stripping solution as compared to adhesive compositions made of other materials suitable for the high temperature processing.

The present invention is accomplished in view of the above problems. An object of the present invention is to provide an adhesive composition (i) which can prevent that properties of a component in the adhesive composition are changed and adhesiveness of the adhesive composition decreases in a high temperature environment (for example, at a temperature of not less than 250° C. for 1 hour) and (ii) which is improved in solubility for a stripping solution after the adhesive composition has been exposed to high temperature.

Solution to Problem

An adhesive composition of the present invention is an adhesive composition including a polymer obtained by copolymerizing a monomer composition containing a (meth)

acrylic acid ester and a monomer having a maleimide group, the (meth)acrylic acid ester has a structure represented by General Formula (1):

[Chem. 1]

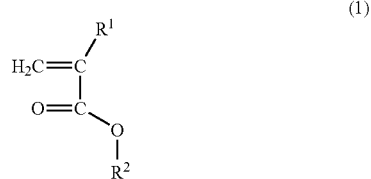

(1)

wherein $R^1$ is a hydrogen atom or a methyl group, and $R^2$ is a C4 to C20 alkyl group, and the (meth)acrylic acid ester is contained in the monomer composition by 10 to 50 parts by mass where an amount of the monomer composition is 100 parts by mass.

Advantageous Effects of Invention

The adhesive composition of the present invention includes a polymer obtained by copolymerizing a monomer composition containing the (meth)acrylic acid ester represented by General Formula (1) and the monomer having a maleimide group. This allows the adhesive composition of the present invention (i) to prevent that properties of a component in the adhesive composition are changed and adhesiveness of the adhesive composition decreases in a high temperature environment (for example, at a temperature of not less than 250° C. for 1 hour) and (ii) to improve solubility of the adhesive composition even after the adhesive composition has been exposed to high temperature. As a result, even if a product (being processed) that is bonded by use of an adhesive agent constituted by the adhesive composition of the present invention is subjected to high temperature processing (for example, a process in which the product is exposed to a high temperature of not less than 250° C. for 1 hour), the adhesive agent is not stripped off from the product and properties of the adhesive agent are not changed during the high temperature processing. In addition, it is also possible to easily and perfectly remove the adhesive agent from the product after the high temperature processing.

DESCRIPTION OF EMBODIMENTS

Adhesive Composition

One embodiment of an adhesive composition according to the present invention is described below.

The adhesive composition of the present invention includes a polymer obtained by copolymerizing (a) a (meth) acrylic acid ester having a structure represented by General Formula (1):

[Chem. 2]

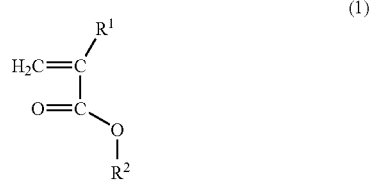

(1)

wherein $R^1$ is a hydrogen atom or a methyl group and $R^2$ is a C4 to C20 alkyl group, the (meth)acrylic acid ester being contained in the following monomer composition by 10 to 50 parts by mass where an amount of the following monomer composition is 100 parts by mass, and (b) a monomer composition containing a monomer having a maleimide group.

A purpose of usage of the adhesive composition is not especially limited provided that the adhesive composition is used as an adhesive agent. The present embodiment describes the adhesive composition by taking as an exemplary purpose a wafer support system in which a semiconductor wafer is temporarily bonded to a support plate by use of the adhesive composition of the present invention.

((Meth)acrylic Acid Ester)

The adhesive composition of the present invention contains a (meth)acrylic acid ester as a monomer in a monomer composition. In the specification, the (meth)acrylic acid ester according to the present invention indicates alkyl (meth)acrylate having a C4 to C20 alkyl group.

Examples of the alkyl(meth)acrylate are alkyl esters of acrylic or methacrylic acid having an alkyl group (for example, a tert-butyl group, a cyclohexyl group, an isobornyl group, a dicyclopentanyl group, a butyl group, a 2-ethylhexyl group, an isooctyl group, an isononyl group, an isodecyl group, a dodecyl group (a lauryl group), a tridecyl group, a pentadecyl group, a hexadecyl group, a heptadecyl group, an octadecyl group (a stearyl group), a nonadecyl group, or an eicosyl group). The alkyl group in the alkyl(meth)acrylate can be straight, branched, or cyclic. From the viewpoint of improving solubility without decreasing a glass transition temperature (Tg) of the adhesive composition, the alkyl group in the alkyl (meth)acrylate is preferably branched or cyclic. This can realize properties (heat resistance and high adhesiveness in a high temperature environment) suitable for high temperature processing (for example, a process in which the adhesive composition is exposed to a high temperature of not less than 250° C. for 1 hour), in a case where Tg of the adhesive composition is not less than 100° C., for example. For this reason, it is preferable that a suitable alkyl group is selected as appropriate from alkyl groups that can satisfy the above condition. Accordingly, among the above exemplary groups, the alkyl group of the alkyl(meth)acrylate is preferably the tert-butyl group, the lauryl group, the stearyl group, the cyclohexyl group, the isobornyl group, or the dicyclopentanyl group. In at least two alkyl groups having the same carbon number, a branched or cyclic alkyl group takes up larger space than a straight alkyl group. It is considered that this contributes to an improvement in the solubility while maintaining relatively high Tg. In the specification, the branched or cyclic alkyl group that takes up relatively large space is referred to as a "bulky" functional group.

One type of the alkyl(meth)acrylates for constituting a polymer contained in the adhesive composition may be used solely, or two or more types of the alkyl(meth)acrylates may be used in combination.

A content of the alkyl(meth)acrylate is not especially limited as long as copolymerization with other compounds included in the monomer composition proceeds and the content does not exceed the following range. The content of the alkyl(meth)acrylate may be appropriately selected according to aimed properties (aimed adhesive strength, aimed heat resistance, and the like) of the adhesive composition. More specifically, the alkyl(meth)acrylate is contained by not less than 10 parts by mass but not more than 50 parts by mass when a total amount of the monomer composition containing the alkyl(meth)acrylate and the after-mentioned monomer having a maleimide group is 100 parts by mass. Moreover, the alkyl(meth)acrylate is contained preferably by not less than 15 parts by mass but not more than 40 parts by mass, especially preferably by not less than 20 parts by mass but not more than 40 parts by mass. When the alkyl(meth)acrylate is contained by not less than 10 parts by mass, it is possible to further improve flexibility and crack resistance of an obtained adhesive layer. When the alkyl (meth)acrylate is contained by not more than 50 parts by mass, it is possible to suppress a decrease in heat resistance, poor stripping, degassing, and an increase in moisture-absorption. Further, a polymer obtained by copolymerizing the monomer composition contains a repeating unit of the alkyl(meth)acrylate within a range of 10 to 50 mol %.

(Monomer Having Maleimide Group)

The adhesive composition according to the present invention contains a monomer having a maleimide group, as a monomer in the monomer composition. The adhesive composition containing a polymer constituted by the monomer having a maleimide group and the (meth)acrylic acid ester has an imide ring (a heterocyclic ring having an imide group) in a main chain of the polymer. This allows the adhesive composition of the present invention to have high adhesive strength in a high temperature environment (especially, at not less than 250° C.), as well as the adhesive composition excels in resistance to an alkaline solution and heat resistance. Further, the adhesive composition can be easily stripped off even after the adhesive composition has been subjected to a high-temperature process, such as a heat treatment in which the adhesive composition is exposed to a high temperature of 250° C. for 1 hour.

The monomer having a maleimide group is not especially limited provided that the monomer has a maleimide group and can be copolymerized with other monomer components. However, the monomer having a maleimide group is preferably a compound represented by General Formula (2):

[Chem. 3]

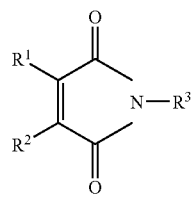

(2)

(where $R^1$ through $R^3$ are independently a hydrogen atom or a C1 through C20 organic group, and the organic group may contain an oxygen atom, a nitrogen atom, a sulfur atom, and a halogen atom).

The organic group represented by $R^1$ or $R^2$ in General Formula (2) is preferably a hydrogen atom, a methyl group, or an ethyl group. Especially, a hydrogen atom is more preferable among them.

The organic group represented by $R^3$ in General Formula (2) is preferably a straight or branched alkyl group, an alicyclic hydrocarbon group, an aryl group, an aralkyl group, or an organic group having a maleimide group. Especially, the alkyl group, the alicyclic hydrocarbon group, and the aryl group are more preferable among them.

In the specification, an "aliphatic series" is a relative concept with respect to an aromatic series and defined as a group, a compound, or the like having no aromatic property. For example, the "aliphatic, cyclic hydrocarbon group (alicyclic hydrocarbon group)" indicates a monocyclic hydrocarbon group or a polycyclic hydrocarbon group having no aromatic property.

Further, the alkyl group, the alicyclic hydrocarbon group, or the aryl group, represented by $R^3$, may have a substituent group. The substituent group is not especially limited, but may be, for example, a halogen atom, a straight or branched C1 to C6 alkyl group, a C3 to C6 alicyclic hydrocarbon group, or the like. In the specification, "having a substituent group" means that part of or all hydrogen atoms in the alkyl group, the alicyclic hydrocarbon group, or the aryl group is/are substituted with a substituent group. The halogen atom may be, for example, a fluorine atom, a chlorine atom, a bromine atom, an iodine atom, or the like. The fluorine atom is especially preferable as the halogen atom.

Examples of the alkyl group represented by $R^3$ encompass a methyl group, an ethyl group, a propyl group, a butyl group, a pentyl group, a hexyl group, a heptyl group, an octyl group, a lauryl group, and a stearyl group. Among them, the methyl group is especially preferable.

Examples of a monomer having a maleimide group, in which the organic group represented by $R^3$ is the alkyl group, encompass: N-methylmaleimide; N-ethylmaleimide; N-n-propylmaleimide; N-isopropylmaleimide; N-n-butylmaleimide; N-isobutylmaleimide; N-sec-butylmaleimide; N-tert-butylmaleimide; N-n-pentylmaleimide; N-n-hexylmaleimide; N-n-heptylmaleimide; N-n-octylmaleimide; N-laurylmaleimide; and N-stearylmaleimide. Among them, the N-methylmaleimide is especially preferable in terms of stability in industrial supply and excellent heat resistance.

The alicyclic hydrocarbon group represented by $R^3$ may be a cyclopropyl group, a cyclobutyl group, a cyclopentyl group, a cyclohexyl group, a cycloheptyl group, or a cyclooctyl group. Among them, the cyclohexyl group is especially preferable.

Examples of a monomer having a maleimide group, in which the organic group represented by $R^3$ is the alicyclic hydrocarbon group, encompass: N-cyclopropylmaleimide; N-cyclobutylmaleimide; N-cyclopentylmaleimide; N-cyclohexylmaleimide; N-cycloheptylmaleimide; and N-cyclooctylmaleimide. Among them, the N-cyclohexylmaleimide is especially preferable in terms of stability in industrial supply and excellent heat resistance.

The aryl group represented by $R^3$ may be a phenyl group, a methylphenyl group, or the like. Among them, the phenyl group is especially preferable.

Examples of a monomer having a maleimide group, in which the organic group represented by $R^3$ is the aryl group, encompass: N-phenylmaleimide; N-m-methylphenylmaleimide; N-o-methylphenylmaleimide; and N-p-methylphenylmaleimide. Among them, the N-phenylmaleimide is especially preferable in terms of stability in industrial supply and excellent heat resistance.

In addition to the above examples, there are further other examples of the monomer having a maleimide group, such as: N-benzylmaleimide; N-phenethylmaleimide; 1-methyl-2,4-bismaleimidebenzene; N,N'-m-phenylene bismaleimide; N,N'-p-phenylene bismaleimide; N,N'-m-toluoylene bismaleimide; N,N'-4,4-biphenylene bismaleimide; N,N'-4,4-(3,3'-dimethyl-biphenylene)bismaleimide; N,N'-4,4-(3,3'-dimethyl diphenyl methane)bismaleimide; N,N'-4,4-(3-3'-diethyl diphenyl methane) bismaleimide; N,N'-4,4-diphenylmethane bismaleimide; N,N'-4,4-diphenylpropane bismaleimide; N,N'-3-3'-diphenylsulfone bismaleimide; N,N'-4,4-diphenyl ether bismaleimide; and the like.

One type of these monomers having a maleimide group, for constituting a polymer contained in the adhesive composition, may be used solely, or two or more types of the monomers having a maleimide group may be used in combination.

A content of the monomer having a maleimide group is not limited provided that copolymerization reaction with other compounds contained in the monomer composition proceeds, and may be set as appropriate in accordance with aimed properties of the adhesive composition (aimed adhesive strength and heat resistance). When a total amount of the monomer composition containing the alkyl(meth)acrylate and the monomer having a maleimide group is 100 parts by mass, the monomer having a maleimide group is contained preferably by not less than 1 part by mass but not more than 50 parts by mass, more preferably by not less than 5 parts by mass but not more than 30 parts by mass. In a case where the monomer having a maleimide group is contained by not less than 1 part by weight, it is possible to obtain an adhesive layer in which heat resistance and adhesive strength in a high temperature environment are further improved. In a case where the monomer having a maleimide group is contained by not more than 50 parts by mass, it is possible to obtain an adhesive layer that can be more easily stripped off after the adhesive layer has been subjected to high temperature processing.

Moreover, a polymer obtained by copolymerizing the monomer composition contains a repeating unit of the monomer having a maleimide group preferably by not less than 1 mol % but not more than 20 mol %, more preferably by not less than 5 mol % but not more than 15 mol %. In a case where the repeating unit of the monomer having a maleimide group is contained by not less than 1 mol %, it is possible to obtain an adhesive layer in which the heat resistance and the adhesive strength in the high temperature environment are further improved. In a case where the repeating unit of the maleimide group-containing monomer is contained by not more than 20 mol %, it is possible to obtain an adhesive layer that can be further easily stripped off after the adhesive layer has been subjected to high temperature processing.

(Styrene)

The adhesive composition according to the present invention may further contain styrene as a monomer in the monomer composition. Properties of the styrene do not change even in a high temperature environment of not less than 200° C. This allows improvement in the heat resistance of the adhesive composition.

In a case where the monomer composition contains styrene, a mixed amount of the styrene is not limited provided that copolymerization reaction of the styrene with other compounds contained in the monomer composition proceeds, and may be set as appropriate in accordance with aimed properties of the adhesive composition, such as aimed adhesive strength and heat resistance. For example, the styrene is mixed in the monomer composition preferably by not less than 1 part by mass but not more than 70 parts by mass, more preferably not less than 20 parts by mass but not more than 70 parts by mass, where a total amount of the monomer composition containing the styrene, the alkyl (meth)acrylate, and the monomer having a maleimide group is 100 parts by mass. In a case where the styrene is mixed by not less than 1 part by mass, it is possible to further improve the heat resistance. In a case where the styrene is mixed by not more than 70 parts by mass, it is possible to restrain a decrease in crack resistance.

Further, in a case where a polymer obtained by copolymerizing the monomer composition contains the styrene, it is preferable that the polymer obtained by copolymerizing the monomer composition contain a repeating unit of the styrene in a range from 1 mol % to 70 mol %.

(Other Acrylic Ester)

Besides the ones described in the section ((Meth)acrylic Acid Ester), the monomer composition to obtain the adhesive composition according to the present invention may includes another acrylic ester. The another acrylic ester is a publicly known ester used for a conventional acrylic adhesive agent. Examples of the another acrylic ester encompass alkyl esters of acrylic or methacrylic acid having an alkyl group (for example, a C1 to C3 alkyl group, an alkyl group having 21 or more carbon atoms, and the like).

The another acrylic ester can constitute a remaining part in the monomer composition other than the (meth)acrylic acid ester and the monomer having a maleimide group (and the styrene, in some cases). That is, a content of the another acrylic ester may be changed as appropriate in accordance with the content of the (meth)acrylic acid ester and the monomer having a maleimide group (and the styrene, in some cases).

(Components Other than Above Components in Adhesive Composition)

The adhesive composition according to the present invention may further include, to an extent in which essential properties of the present invention is not lost, miscible additives, for example, an addition resin, a plasticizing agent, an adhesive auxiliary agent, a stabilization agent, a coloring agent, and a surface active agent, each of which is commonly used in the technical field that the present invention pertains to, for improving effectiveness of an adhesive agent.

Further, the adhesive composition may be diluted by use of an organic solvent in the extent in which the essential properties of the present invention is not lost, so that viscosity of the adhesive composition may be adjusted. Examples of the organic solvent encompass: ketones such as acetone, methyl ethyl ketone, cyclohexanone, methyl isoamyl ketone, and 2-heptanone; polyhydric alcohols and derivatives thereof such as monomethyl ethers, monoethyl ethers, monopropyl ethers, monobutyl ethers, or monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate; cyclic ethers such as dioxane; and esters such as methyl lactate, ethyl lactate, methyl acetate, ethyl acetate, butyl acetate, methyl pyruvate, ethyl pyruvate, methyl methoxy propionate, and ethyl ethoxy propionate. These organic solvents may be used solely, or two or more of the organic solvents may be used in combination. Particularly, it is more preferable to use the polyhydric alcohols and derivatives thereof such as the monomethyl ethers, monoethyl ethers, monopropyl ethers, monobutyl ethers, and monophenyl ethers of ethylene glycol, ethylene glycol monoacetate, diethylene glycol, diethylene glycol monoacetate, propylene glycol, propylene glycol monoacetate, dipropylene glycol, or dipropylene glycol monoacetate.

An amount of the organic solvent to be used is set as appropriate in accordance with a desired film thickness of the adhesive composition to be applied. On this account, the amount of the organic solvent to be used is not especially limited as long as the adhesive composition is in a concentration in which the adhesive composition can be applied to a supporting body such as a semiconductor wafer or the like. Generally, the organic solvent is used so that a solid content concentration of the adhesive composition in the organic solvent and adhesive composition is in a range of 20 mass % to 70 mass %, and more preferably in a range of 25 mass % to 60 mass %.

[Copolymerization Reaction]

The copolymerization reaction of the monomer composition may be carried out by a publicly known method, and is not especially limited in any particular manner. For example, the adhesive composition of the present invention can be obtained by stirring the monomer composition by use of an existing stirring device.

A temperature condition in the copolymerization reaction may be set as appropriate and is not limited. However, the temperature condition is preferably in a range of 60 to 150° C., further preferably in a range of 70 to 120° C.

In the copolymerization reaction, a solvent may be used as appropriate. The aforementioned organic solvents can be used as the solvent. Among the aforementioned organic solvents, propylene glycol monomethyl ether acetate (hereinafter, referred to as "PGMEA") is more preferable.

In the copolymerization reaction to obtain the adhesive composition according to the present invention, a polymerization initiator may be used as necessary. Examples of the polymerization initiator encompass: azo compounds such as 2,2'-azobisisobutylonitrile, 2,2'-azobis(2-methylbutylonitrile), dimethyl 2,2'-azobis isobutyrate, 1,1'-azobis(cyclohexane-1-carbonitrile), and 4,4'-azobis(4-cyanovaleric acid); and organic peroxides such as decanoyl peroxide, lauroyl peroxide, benzoyl peroxide, bis(3,5,5-trimethyl hexanoyl)peroxide, succinic acid peroxide, tert-butyl peroxy-2-ethylhexanoate, tert-butyl peroxypivalate, and 1,1,3,3-tetramethylbutylperoxy-2-ethylhexanoate. One type of these polymerization initiators may be used solely, or alternatively two or more types of the polymerization initiators may be used in combination as necessary. An amount of the polymerization initiator to be used may be set as appropriate in accordance with a combination of the monomer composition, reaction conditions, and the like, and is not particularly limited.

[Film Adhesive]

A film adhesive according to the present invention includes a film, and an adhesive layer provided on the film, containing any one of the aforementioned adhesive compositions. The film adhesive can be obtained in the process of a film adhesive method. The film adhesive method is such that (i) a film adhesive is formed in advance in such a manner that an adhesive layer containing any of the aforementioned adhesive compositions is formed, in advance, on a film that is a temporal base material, such as a flexible film, and then the adhesive layer is dried so as to form a film adhesive, and (ii) the film adhesive thus formed is used by being attaching to a material to be processed.

As described in the section [Adhesive Composition], since the adhesive composition contains the monomer having a maleimide group, the adhesive layer constituted by the adhesive composition is excellent in heat resistance and adhesive strength in a high temperature environment. Accordingly, the film adhesive according to the present invention is also excellent in heat resistance and adhesive strength in a high temperature environment.

The film adhesive may be arranged such that a protection film is further provided on an adhesive surface of the adhesive layer. In this case, the adhesive layer is easily provided on a material to be processed in such a manner that (i) the protection film which covers the adhesive layer is peeled off, (ii) the adhesive layer thus exposed is placed on the material to be processed, and (iii) the film (flexible film or the like) is peeled off from the adhesive layer.

The adhesive composition according to the present invention as described above may be used in various ways depending on its purpose. For example, the adhesive composition in a liquid form may be applied on a material to be processed, such as a semiconductor wafer, so as to form an adhesive layer. However, the use of the film adhesive according to the present invention allows formation of an adhesive layer having an even thickness and a good surface smoothness as compared to a case where the adhesive composition is directly applied on a material to be processed so as to form an adhesive layer.

The film to be used in manufacture of the film adhesive is not limited, as long as an adhesive layer formed on the film is strippable from the film and the film is a release film which can transfer the adhesive layer to a surface to be processed of a protection board, a wafer, or the like. An example of the film for forming the adhesive layer is a flexible film made of a synthetic resin film, such as polyethylene terephthalate, polyethylene, polypropylene, polycarbonate or polyvinyl chloride, and having a thickness of 15 µm to 125 µm. It is preferable for the film to be releasing-processed if necessary so that transfer can be readily carried out.

A publicly known method may be appropriately used as a method for forming the adhesive layer on the film in accordance with a desired thickness or a desired evenness of the adhesive layer, and is not particularly limited. The publicly known method may be, for example, a method in which the adhesive composition according to the present invention is applied on a film by use of an applicator, a bar coater, a wire bar coater, a roll coater, or a curtain flow coater so that a dried adhesive layer to be formed on the film has a film thickness of 10 to 1000 µm. The roll coater is especially preferable among them because the roll coater is suitable to form an adhesive layer excellent in uniform thickness and the use of the roll coater allows efficiently forming a film having a large thickness.

In a case where the protection film is to be used, the protection film to be used is not limited as long as the film is strippable from the adhesive layer. However, it is preferable for the protection film to be, for example, a polyethylene terephthalate film, a polypropylene film, or a polyethylene film. Moreover, the protection film is preferably a film on which silicon is applied by coating or baking. This allows the protection film to be easily stripped off from the adhesive layer. A thickness of the protection film is not particularly limited, but is preferably in a range of 15 µm to 125 µm. This is because the adhesive film attached to the protection film can secure flexibility of the film adhesive.

A method of using the film adhesive is not particularly limited. For example, the following method may be taken in a case where the protection film is used: (i) the protection film is stripped off from the film adhesive, (ii) the adhesive layer thus exposed is placed on a surface of a material to be processed, and (iii) a heating roller is rolled on the film (a back surface of the surface on which the adhesive layer is formed), so that the adhesive layer is thermally compressed onto the surface of the material to be processed. At this time, by sequentially rolling up the protection film on a roller such as a reel roller, the protection film thus stripped off from the film adhesive may be stored and reused.

The purpose of usage of the adhesive composition of the present invention is not particularly limited. However, the adhesive composition is suitably used as an adhesive composition for adhering, to a substrate such as a semiconductor wafer, a protection board for use in high-precision processing of a semiconductor wafer. The adhesive composition of the present invention is particularly suitably used as an adhesive composition (or an adhesive layer containing the adhesive composition) for attaching a substrate to a support plate, when the substrate such as the semiconductor wafer is grinded so that a thickness of the substrate is reduced (e.g., Japanese Patent Application Publication, Tokukai, No. 2005-191550 A).

[Stripping Solution]

A commonly used stripping solution may be used as a stripping solution for removing the adhesive composition according to the present invention. However, from the viewpoint of environmental burden and strippability, a stripping solution whose main component is PGMEA, ethyl acetate, or methyl ethyl ketone is preferably used.

The following deals with examples of the adhesive composition of the present invention. However, the following examples are just exemplified to facilitate understanding of the present invention and do not limit the present invention.

EXAMPLES

Preparation of Adhesive Composition

An adhesive composition according to Embodiment 1 was prepared as follows.

Into a 300 ml four-neck flask equipped with a reflux condenser, a stirrer, a thermometer, and a nitrogen inlet tube, (i) 111.6 g of PGMEA as a solvent, and (ii) as shown in Table 1, 25 g of methyl methacrylate, 34 g of styrene, 25 g of t-butyl methacrylate, and 18 g of cyclohexylmaleimide, those as monomers, were added, and blowing of $N_2$ into the flask was initiated. A mixture in the flask was stirred so that polymerization was initiated. While the mixture was being stirred, a temperature in the flask was increased to 100° C. Then, a mixed solution containing 111.6 g of PGMEA and 1 g of t-butyl peroxy 2-ethylhexanoate (a polymerization initiator) was continuously dropped into the flask via a dropping nozzle over 4 hours. The mixed solution was dropped at constant speed.

After the dropping was completed, an obtained polymerization reaction solution was left for aging at 100° C. for 1 hour. Then, a mixed solution containing 25.10 g of PGMEA and 0.3 g of t-butyl peroxy 2-ethylhexanoate was dropped into the polymerization reaction solution over 1 hour. Subsequently, the polymerization reaction solution was further left for aging at 100° C. for 1 hour, and then 1.0 g of 1,1,3,3-tetramethylbutylperoxy 2-ethylhexanoate was added to the polymerization reaction solution at once. The polymerization reaction solution was then left for aging at 100° C. for 3 hours.

After a temperature of the polymerization reaction solution was increased until a reflux of the solvent was observed, the polymerization reaction solution was left for aging for 1 hour. Thereafter, the polymerization was terminated. In this way, a resin 1 (adhesive composition) of Example 1 was synthesized.

Resins according to Examples 2 through 9 and Comparative Examples 1 through 5 were also prepared in the same manner as the resin of Example 1.

Compositions of monomer compositions used in Examples and Comparative Examples and properties (theoretical Tg, an average molecular weight, and the like) of resins synthesized from those monomer compositions in Examples and Comparative Examples are shown in Tables 1 through 3.

TABLE 1

|  | Com. Ex. 1 | Ex. 1 | Ex. 2 | Ex. 3 |
|---|---|---|---|---|
| Methyl methacrylate | 50 | 25 | 25 | 25 |
| Styrene (Mixed after initiation of synthesis reaction) | 32 | 34 | 34 | 34 |
| t-butyl methacrylate | 0 | 25 | 35.5 | 0 |
| Cyclohexane methacrylate | 0 | 0 | 0 | 25 |
| Cyclohexylmaleimide | 18 | 18 | 18 | 18 |
| Theoretical Tg (° C.) | 125 | 126 | 124 | 113 |
| Mw (RI detection) | 83,300 | 80,100 | 79,500 | 83,500 |
| Mw/Mn | 12.4 | 12.5 | 11.9 | 12.8 |

*Abbreviation: Ex. stands for Example. Com. Ex. stands for Comparative Example.

TABLE 2

|  | Com. Ex. 2 | Com. Ex. 3 | Com. Ex. 4 | Ex. 4 |
|---|---|---|---|---|
| Methyl methacrylate | 82 | 41 | 0 | 41 |
| t-butyl methacrylate | 0 | 58.2 | 82 | 41 |
| Cyclohexylmaleimide | 25 | 25 | 25 | 25 |
| Theoretical Tg (° C.) | 134 | 131 | 136 | 135 |
| Mw (RI detection) | 80,700 | 79,800 | 80,000 | 83,900 |
| Mw/Mn | 7.9 | 8.2 | 8 | 9 |

*Abbreviation: Ex. stands for Example. Com. Ex. stands for Comparative Example.

TABLE 3

|  | Com. Ex. 5 | Ex. 5 | Ex. 6 | Ex. 7 | Ex. 8 | Ex. 9 |
|---|---|---|---|---|---|---|
| Styrene (Mixed after initiation of synthesis reaction) | 32 | 62 | 32 | 32 | 32 | 32 |
| Methyl methacrylate | 50 | 0 | 37.5 | 25 | 37.5 | 37.5 |
| Isobornyl methacrylate | 0 | 10 | 0 | 0 | 0 | 0 |
| Acrylic acid | 0 | 1 | 0 | 0 | 3 | 5 |
| Stearyl methacrylate | 0 | 15 | 12.5 | 25 | 12.5 | 12.5 |
| Cyclohexylmaleimide | 18 | 18 | 18 | 18 | 18 | 18 |
| Theoretical Tg (° C.) | 112 | 110 | 110 | 97 | 110 | 110 |
| Mw(RI detection) | 80,400 | 88,400 | 88,400 | 85,500 | 84,800 | 87,400 |
| Mw/Mn | 11.3 | 12.4 | 12.4 | 10.3 | 9.2 | 8.6 |

*Abbreviation: Ex. stands for Example.
Com. Ex. stands for Comparative Example.

Each of the resins of Examples 1 through 9 and Comparative Examples 1 through 5 and a thermal polymerization inhibitor were dissolved in PGMEA so as to prepare an adhesive composition in which a concentration of an acrylic polymer was 40 mass %.

(Evaluation of Solubility with Heat Resistance (Dissolution Rate) of Adhesive Composition and Evaluation of State of Coated Film Layer Heat-Treated at 250° C.)

The adhesive compositions according to Examples 1 through 9 and Comparative Examples 1 through 5 were applied on 6-inch silicon wafers and then dried at 110° C., 150° C., and then 200° C., each for 3 minutes, that is, dried for 9 minutes in total. Thus, coated films according to Examples 1 through 9 and Comparative Examples 1 through 5, each having a thickness of 15 μm, were formed on the silicon wafers.

Solubility, for solvent, of the adhesive compositions deposited on the silicon wafers was measured as follows.

After the silicon wafer on which the adhesive composition was deposited as a coated film layer was heated at 250° C. for 1 hour, the silicon wafer was immersed in PGMEA. After the immersion, it was observed how much the coated film layer dissolved in the solvent. Then, a dissolution rate (nm/sec) was calculated from a relationship between a dissolved thickness of the coated film and a dissolution time. Further, on the basis of the dissolution rates thus calculated, the dissolution rates in Examples 1 through 3 were evaluated comparatively with respect to the dissolution rate in Comparative Example 1. Further, the dissolution rates in Example 4 and Comparative Examples 3 and 4 were evaluated comparatively with respect to the dissolution rate in Comparative Example 2. Moreover, the dissolution rates in Examples 5 through 9 were evaluated comparatively with respect to the dissolution rate in Comparative Example 5.

A state of each of the coated film layers on the silicon wafers that had been heated at 250° C. was observed by use of an optical microscope, and evaluated such that: a coated film layer that was not stripped off was evaluated as "G" (good); and a coated film layer that was stripped off was evaluated as "P" (poor).

Table 4 demonstrates evaluations of (i) the dissolution rates of the adhesive compositions and (ii) the states of the coated film layers that had been heat-treated, according to Examples 1 through 3 and Comparative Example 1. Table 5 demonstrates evaluations of (iii) the dissolution rates of the adhesive compositions and (iv) the states of the coated film layers that had been heat-treated, according to Example 4 and Comparative Examples 2 through 4. Further, Table 6 demonstrates evaluations of (v) the dissolution rates of the adhesive compositions and the states of the coated film layers that had been heat-treated, according to Examples 5 through 9 and Comparative Example 5.

TABLE 4

|  | Com. Ex. 1 | Ex. 1 | Ex. 2 | Ex. 3 |
| --- | --- | --- | --- | --- |
| Dissolution Rate | 1 | 1.28 | 1.41 | 1.29 |
| State of coated film that has been heated at 250° C. | G | G | G | G |

*Abbreviation: Ex. stands for Example. Com. Ex. stands for Comparative Example.

TABLE 5

|  | Com. Ex. 2 | Com. Ex. 3 | Com. Ex. 4 | Ex. 4 |
| --- | --- | --- | --- | --- |
| Dissolution Rate | 1 | 1.5 | 1.67 | 1.33 |
| State of coated film that has been heated at 250° C. | G | P | P | G |

*Abbreviation: Ex. stands for Example. Com. Ex. stands for Comparative Example.

TABLE 6

|  | Com. Ex. 5 | Ex. 5 | Ex. 6 | Ex. 7 | Ex. 8 | Ex. 9 |
| --- | --- | --- | --- | --- | --- | --- |
| Dissolution Rate | 1 | 1.86 | 1.15 | 1.87 | 1.13 | 1.12 |
| State of coated film that has been heated at 250° C. | G | G | G | G | G | G |

*Abbreviation: Ex. stands for Example. Com. Ex. stands for Comparative Example.

As demonstrated in Table 4, the adhesive composition of Examples 1 through 3 were improved in the dissolution rate in comparison with the adhesive compositions of Comparative Example 1 (a product to be compared), while the states of the coated film layers that had been heat-treated were maintained good. Further, as demonstrated in Table 5, the adhesive composition in Example 4 was improved in the dissolution rate in comparison with the adhesive composition in Comparative Example 2 (a product to be compared), while the state of the coated film layer that had been heat-treated was maintained good. Moreover, as demonstrated in Table 6, the adhesive compositions of Examples 5 through 9 were improved in the dissolution rate in comparison with the adhesive composition in Comparative Example 5 (a comparative product), while the states of the coated film layers that had been heated were maintained good. This is probably because the adhesive compositions in Examples 1 through 9 caused so little degassing that the coated film layers were not stripped off. In terms of this, it is considered that the dissolution rates were improved without decreasing adhesiveness. As the content of t-butyl methacrylate increases, degassing may be easily caused. However, it was demonstrated that composition ratios in Examples 1 through 4 attained an adhesive composition suitable for high temperature processing.

INDUSTRIAL APPLICABILITY

The present invention can provide an adhesive composition and a film adhesive each of which can be preferably used in high temperature processing carried out in the course of producing various products. Especially, it is possible to provide an adhesive composition and a film adhesive each of which can be preferably used in a step of processing a semiconductor wafer or a chip in which step the adhesive composition and the film adhesive are exposed in a high temperature environment of not less than 250° C.

What is claimed is:

1. An adhesive composition comprising a polymer obtained by copolymerizing a monomer composition containing a (meth)acrylic acid ester, a monomer having a maleimide group, and styrene, the (meth)acrylic acid ester having a structure represented by Formula (1):

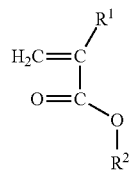 (1)

wherein $R^1$ is a hydrogen atom or a methyl group, and $R^2$ is a C4 to C20 alkyl group, the (meth)acrylic acid ester being contained in the monomer composition in an amount of 10 to 40 parts by mass based on 100 parts by mass of the monomer composition, the monomer having the maleimide group being contained in the monomer composition in an amount of 1 to 50 parts by mass based on 100 parts by mass of the monomer composition, and the styrene being contained in the monomer composition in an amount of 1 to 70 parts by mass based on 100 parts by mass of the monomer composition.

2. The adhesive composition as set forth in claim 1, wherein the alkyl group is any one of a tert-butyl group, a lauryl group, a stearyl group, a cyclohexyl group, an isobornyl group, and a dicyclopentanyl group.

3. A film adhesive comprising:
a film; and
an adhesive layer provided on the film, containing an adhesive composition as set forth in claim 1.

* * * * *